United States Patent Office 2,914,283
Patented Nov. 24, 1959

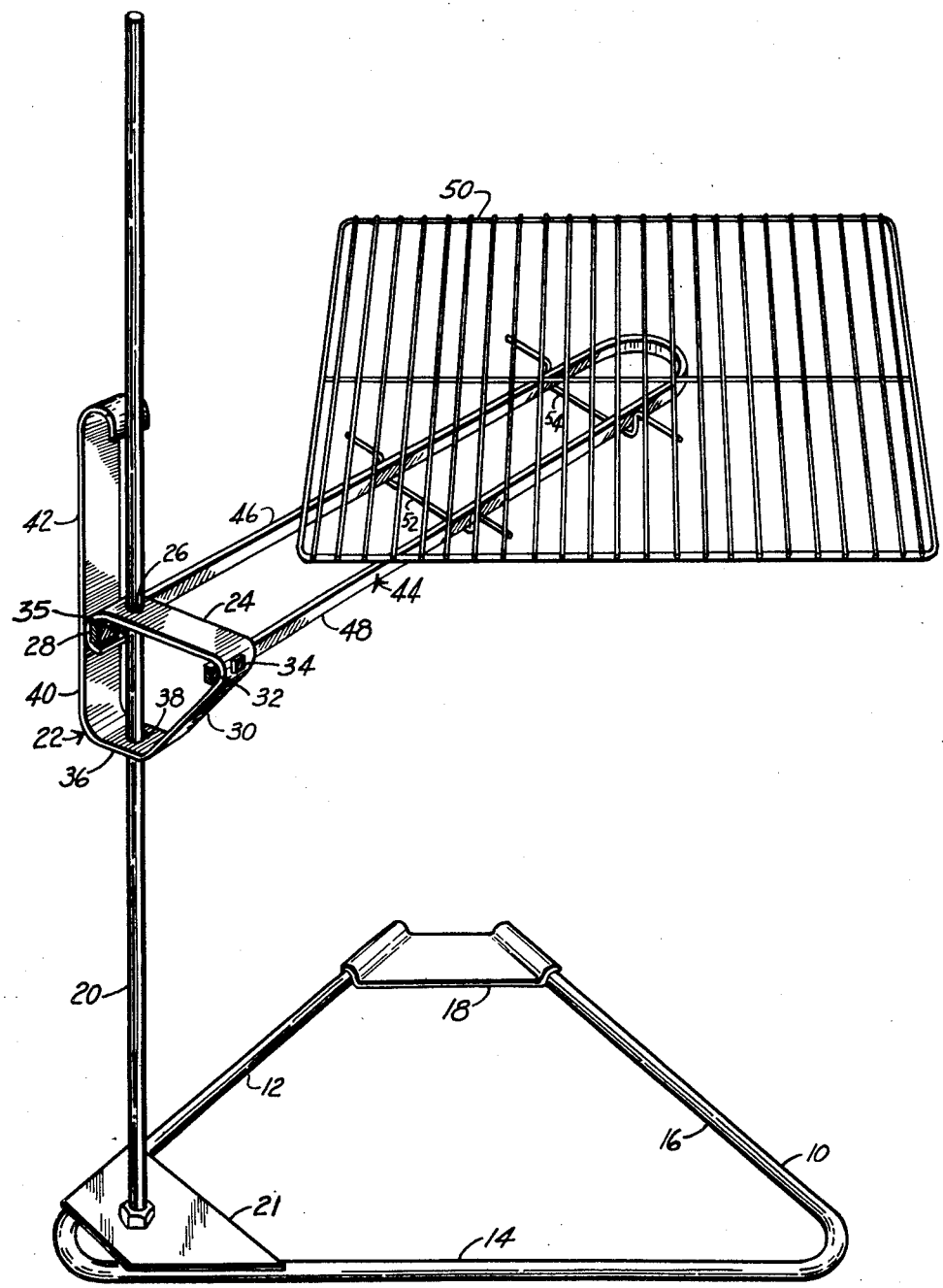

2,914,283

STAND AND BRACKET

Robert A. Jorgensen, Edmonds, Wash., assignor of one-half to Eugene D. Farley, Portland, Oreg.

Application May 6, 1955, Serial No. 506,509

5 Claims. (Cl. 248—125)

This invention relates to grills for cooking in fireplaces and over camp fires.

To be practical, a fireplace grill must meet several requirements. It must be of adjustable height for accommodation to the intensity of the fire. The height adjustment must be made easily from a distance to avoid scorching the cook. The adjustment must be reliable over the operating life of the grill in spite of the corrosive conditions to which it is continuously subjected.

Also, the grill must be swingable outwardly from the fire for loading and unloading and for attending the food as it is cooked. It also must be stable to avoid precipitating the food into the fire. This stability should be achievable when the grill is unloaded, as well as when it is loaded; when it is in operative position over a fire, as well as when it is swung outwardly away from the fire.

Furthermore, the grill should provide a cooking surface which can be maintained level at all times for uniform cooking and security of the food. It should be cleaned easily after each use. When not in use it should stand in one corner of the fireplace where it is inconspicuous, and not likely to interfere with the building of log fires in the fireplace in the usual manner. Still further, it should be demountable so that it may be transported and stored with facility, after which it should be readily reassembled.

It is the general object of this invention to provide a fireplace grill which meets all of the above requirements and which enables cooking over a fireplace fire or camp fire efficiently, safely and pleasurably.

The manner in which this and other objects of the invention are accomplished will be apparent from the accompanying specification and claims considered together with the single figure of the drawing, consisting of a view in perspective of the presently described grill assembly.

Generally stated, the grill assembly of this invention comprises a standard having slidably mounted thereon a bracket which frictionally engages the standard and which is adapted to support a horizontally extending arm. Also, it carries a resilient member positioned for frictionally engaging the standard, thereby acting as a brake for arresting the sliding motion of the bracket on the standard and for maintaining the bracket in a fixed position when this is desired. The assembly also includes a grill member and means for releasably securing the grill member in a level position on the arm carried by the bracket.

Considering the foregoing in greater detail and with particular reference to the drawing:

The fireplace grill of my invention includes a base indicated generally at 10 and preferably formed from a single piece of metal rod bent in a susbtantially triangular configuration thereby providing sides 12, 14 and 16. In forming the triangular base, the ends of the rod are left spaced apart and interconnected by a flat horizontal plate 18. This plate serves as a stabilizing member since when the grill assembly is in operative position in a fireplace, a leg of one of the andirons may be slipped through the gap between the sides 12, 16 of the base and placed upon plate 18. The base may be stabilized further, particularly when the assembly is used outside for cooking over a camp fire, by placing logs or rocks upon it.

Base 10 supports a vertically extending standard 20, the bottom end of which is bolted or otherwise affixed to a plate 21 welded to sides 12, 14 of the base and spanning the angle formed thereby. Since it is spaced apart from stabilizing plate 18, it will be apparent that the stabilizing effect of weight placed on the latter plate will be multiplied by the lever action of the sides of the base.

Standard 20 is of any suitable height and slidably mounts a bracket indicated generally at 22. This bracket serves a plurality of functions which are determinative of the success of the presently described grill assembly. First it supports the grill member. Second, it has an aligning function which enables setting the grill member in a level position and maintaining it level at all times. Third, it enables adjustment of the grill to various elevations. Fourth, it frictionally and releasably engages the standard and ma ntains the grill member adjustable at any selected elevation whether it is loaded or unloaded. Fifth, it enables the grill member to rotate about the standard while remaining at a selected elevation.

Bracket 22 preferably is formed of a single looped strip of a suitable structural material such as iron or steel. It includes a substantially horizontal top section 24, one end of which is perforated at 26. Offsetting the perforation in this manner provides a shelf or ledge which may be tapped with a poker or other implement for lowering the bracket on the standard.

The end of section 24 of the bracket is reversely bent to form a first pocket 28. Side 30 of the bracket, which is opposite pocket 28, is formed at an acute angle with respect to top section 24. This in turn forms a pocket 32 which is substantially aligned on a horizontal plane with pocket 28.

As will be d.scussed further hereinafter, pockets 28, 32 are dimensioned for the reception of two legs of the arm which supports the grill member of the assembly, one of the legs being contained in pocket 28 on one side of standard 20, and the other being retained in pocket 32 on the other side of the standard. The two legs thus are maintained in a flat, level position, being guided to this position by the slope of the guiding inside surface of side 30. Bolts 34, 35 then serve to maintain the arm in its level operative position.

Bracket 22 further includes a bottom section 36. This section is substantially parallel to top section 24 and is perforated at 38. This perforation, as well as perforation 26 in the top section with which it is substantially aligned, is dimensioned for the reception of standard 20 and accordingly may be mounted slidably on the standard.

A sliding fit is present between the side walls of the perforations and the standard which however is sufficiently close to maintain the bracket when loaded in a selected position on the standard. Since the perforations are spaced apart, the bracket is releasably locked in the selected position whenever a load is placed on the grill by the bight resulting from the forced frictional engagement of the side walls of the perforations with the standard.

Bracket 22 also includes a second side wall 40 which is spaced apart from standard 20 but substantially parallel thereto. It may be bolted to pocket 28 with bolt 35, thereby completing the looped assembly to form a trapezoidal configuration.

Means are provided for maintaining the bracket in a selected position on the standard when it is not carrying a load. Such means may comprise a resilient brake member carried by a rigid extension of section 40. In the illustrated form, however, it comprises a reversely bent resilient extension 42 of section 40. The terminal bent portion of this section frictionally engages the standard and bears resiliently against the standard with a substantial pressure, thereby acting as a spring brake for maintaining the bracket in place.

As has been indicated above, bracket 22 is used to support an arm which in turn supports the grill member upon which the cooking is done. In its preferred embodiment the arm comprises a bifurcated member formed by reversely bending a single strip of resilient metal. Arm 44 thus includes the two legs 46, 48, the terminal segments of which are dimensioned for reception, respectively, in pockets 28, 32. The resiliency of the arm is such that a slight force is required to squeeze together its component members sufficiently for their terminal portions to be inserted in the pockets.

When this is the case, release of pressure on the arm will cause angled surface 30 of the bracket to guide leg 48 of the arm upwardly until it seats in pocket 32. In this manner the arm is made self-aligning so that whenever it is mounted on the bracket it will assume a level position and may be maintained in this position throughout its period of use by means of bolts 34, 35 and other suitable fastening means.

A grill member 50 is mounted on arm 44. This member is dimensioned suitably for supporting the desired quantity of food to be cooked, and preferably is substantially rectangular in outline. It then is mounted diagonally on the arm 44 by means of loops 52, 54, a diagonal position being preferred in order to extend the reach of the assembly and insure that the unit will fit squarely against the back of the fireplace.

*Operation*

The operation of the herein described grill assembly is as follows:

To assemble the grill, standard 20 first is bolted to plate 22 on base 10. The ends of bifurcated arm 44, are inserted into pockets 28 and 32 of bracket 22, as indicated herein above, angled surface 30 and pocket 28 serve a guiding function during this operation. Bolts 34 and 35 are then tightened to make arm 44 and bracket 22 a single unit. This unit is then slipped over standard 20 and adjusted to the desired height. Grill 50 then may be slipped over the arm to provide the necessary cooking surface.

Bracket 22 and arm 44 together with grill 50 which it carries are maintained on the standard first by the friction fit or bight exerted by the bracket on the standard, and second, by the resilient pressure of spring brake 42. When the grill carries a cooking load, the bight will be intensified so that the grill is locked in place, secured against sliding downwardly. Also, its construction is such that it cannot be rendered inoperative in time by the corrosive environment in which the grill is used.

When the grill is not in use, the grill member 50 may be removed from arm 44 and rested in a vertical position along the fireplace side wall. The remaining components of the assembly also may be left in position, with standard 20 and arm 44 adjacent the wall, and with the base lying flat against the hearth. As a result, the entire assembly is inconspicuous and out of the way where it will not interfere with the normal use of the fireplace. Then when the grill is to be used again, the only adjustment required is to swing arm 44 outwardly, adjust it to the desired elevation and slip grill member 50 over it.

Also if it is desired to disassemble the assembly this may be done quickly and rapidly after which it may be stored in a package of relatively small volume, for storage or transportation preliminary to a subsequent use.

It is to be understood that the form of my invention herewith shown and described is to be taken as a preferred example of the same and that various changes in the shape, size and arrangement of parts may be resorted to without departing from the spirit of my invention or the scope of the subjoined claims.

Having thus described my invention, I claim:

1. A support assembly comprising, in combination, a vertical standard, a bracket formed from a single piece of material assuming substantially a trapezoidal configuration comprising a horizontal top section having at one end a reversely bent extension forming a first pocket, a first side section extending at an acute angle from the other end of the top section and forming a second pocket spaced horizontally apart from the first pocket, the top section having a perforation intermediate the pocket portions, a horizontal bottom section extending from the first side section, the bottom section having a perforation vertically aligned with the perforation in the top section for slidably receiving the standard, a second side section extending upwardly from the bottom section to the reversely bent extension end of the top section, a laterally disposed reversely bent support arm having terminal portions seated in the first and second pockets of the bracket whereby to project the arm therefrom in a substantially horizontal plane, first fastening means engageable with the second side section, the first pocket and one of the terminal portions of the arm to connect together the reversely bent end of the bracket and the second side section and to hold the one terminal portion of the support arm in the first pocket, and second fastening means holding the other terminal portion of the support arm in the second pocket.

2. The support assembly of claim 1 wherein the second side section extends upwardly beyond the horizontal top section and frictionally engages the standard to adjustably secure the bracket in selected vertical positions on the standard.

3. A support assembly comprising, in combination, an elongated standard, a bracket including spaced interconnected parallel sections having aligned perforations intermediate their ends for slidably receiving the standard, the bracket being formed with a pair of parallel arm-receiving pockets spaced apart and directed in a plane perpendicular to the axis of the standard, and an elongated support member having laterally spaced resilient parallel arm portions having their ends removably retained in the spaced pockets, the support member being disposed in the aforementioned plane.

4. The support assembly of claim 3, including a resilient arm secured to the bracket and frictionally engaging the standard at a point spaced longitudinally from the bracket.

5. The support assembly of claim 3, including a substantially triangular horizontal base supporting the standard in vertical position adjacent one corner thereof, and a weight-supporting plate mounted on the base adjacent another corner thereof.

References Cited in the file of this patent

UNITED STATES PATENTS

| | | |
|---|---|---|
| 945,520 | Greenwood | Jan. 4, 1910 |
| 1,039,226 | Vaughan | Sept. 24, 1912 |
| 1,201,427 | Angvick | Oct. 17, 1916 |
| 1,423,612 | Jewett | July 25, 1922 |
| 1,599,511 | Brown | Sept. 14, 1926 |
| 1,649,645 | Allen | Nov. 15, 1927 |
| 1,837,411 | Cutter | Dec. 22, 1931 |
| 2,321,901 | Eddy | June 15, 1943 |
| 2,531,298 | Rucker | Nov. 21, 1950 |
| 2,608,149 | Ellis | Aug. 26, 1952 |
| 2,671,373 | Sanzone | Mar. 9, 1954 |
| 2,698,726 | Howe | Jan. 4, 1955 |